No. 772,155. PATENTED OCT. 11, 1904.
P. KAMMERER.
TUNNEL CONSTRUCTION.
APPLICATION FILED APR. 8, 1904.
NO MODEL. 6 SHEETS—SHEET 5.
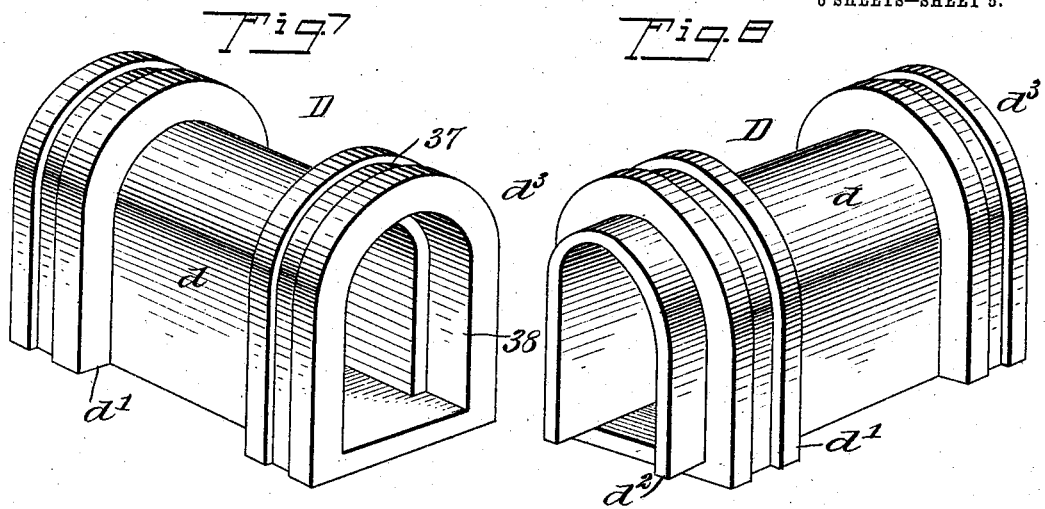
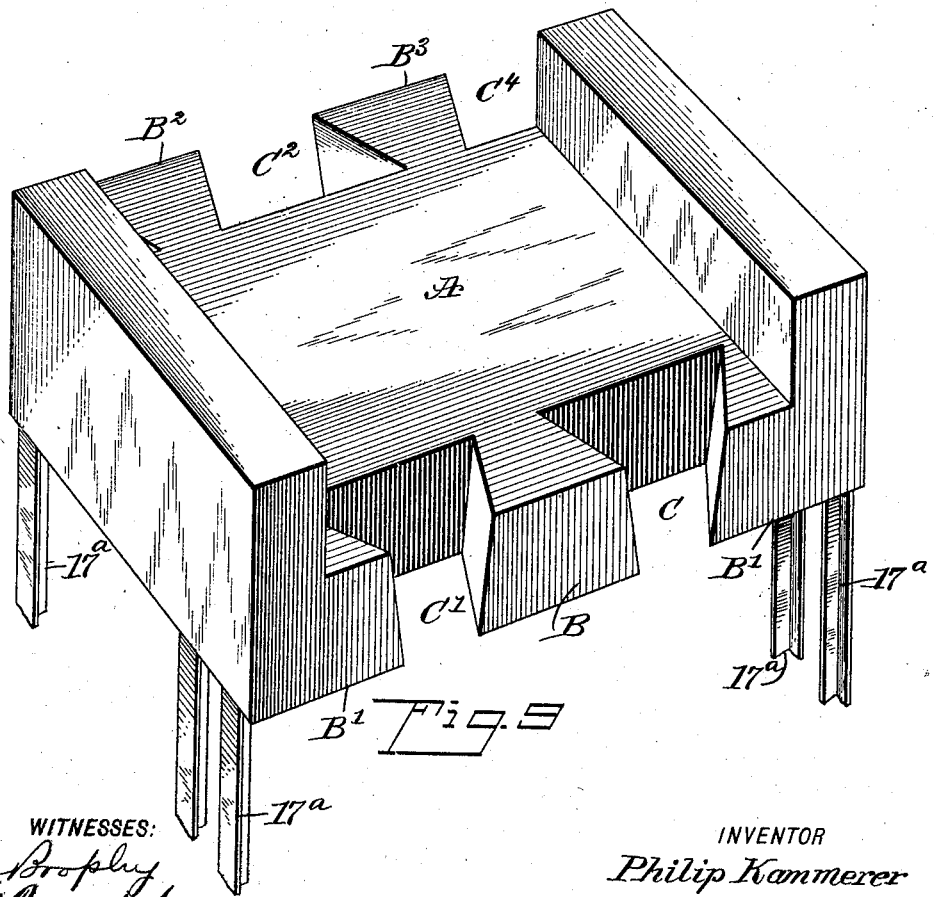
WITNESSES:
INVENTOR
Philip Kammerer
BY
ATTORNEYS No. 772,155. PATENTED OCT. 11, 1904.
P. KAMMERER.
TUNNEL CONSTRUCTION.
APPLICATION FILED APR. 8, 1904.
NO MODEL. 6 SHEETS—SHEET 6.
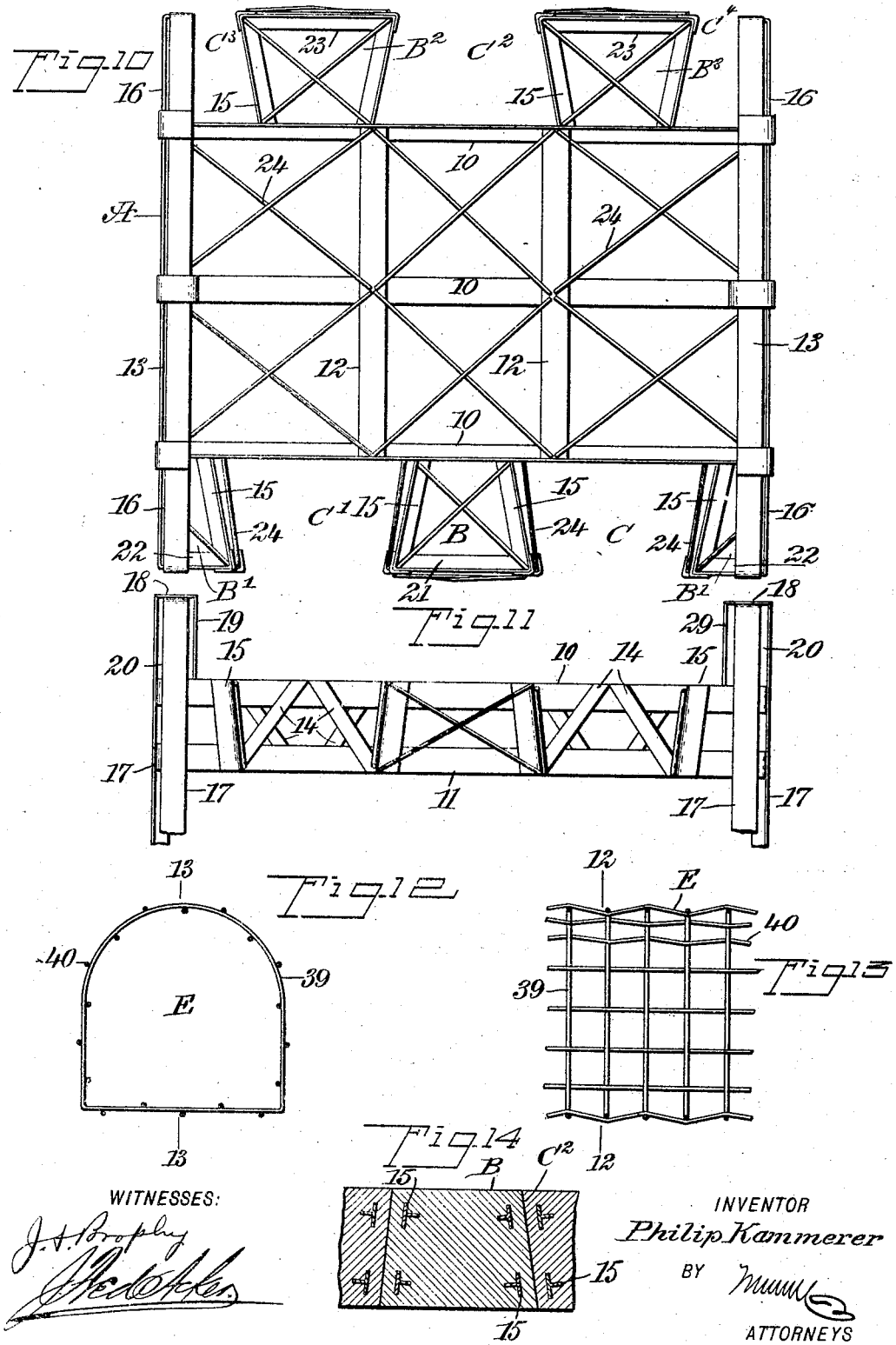
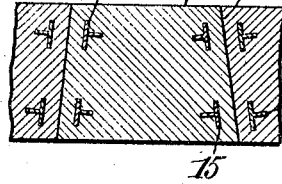
WITNESSES:
INVENTOR
Philip Kammerer
BY
ATTORNEYS No. 772,155.

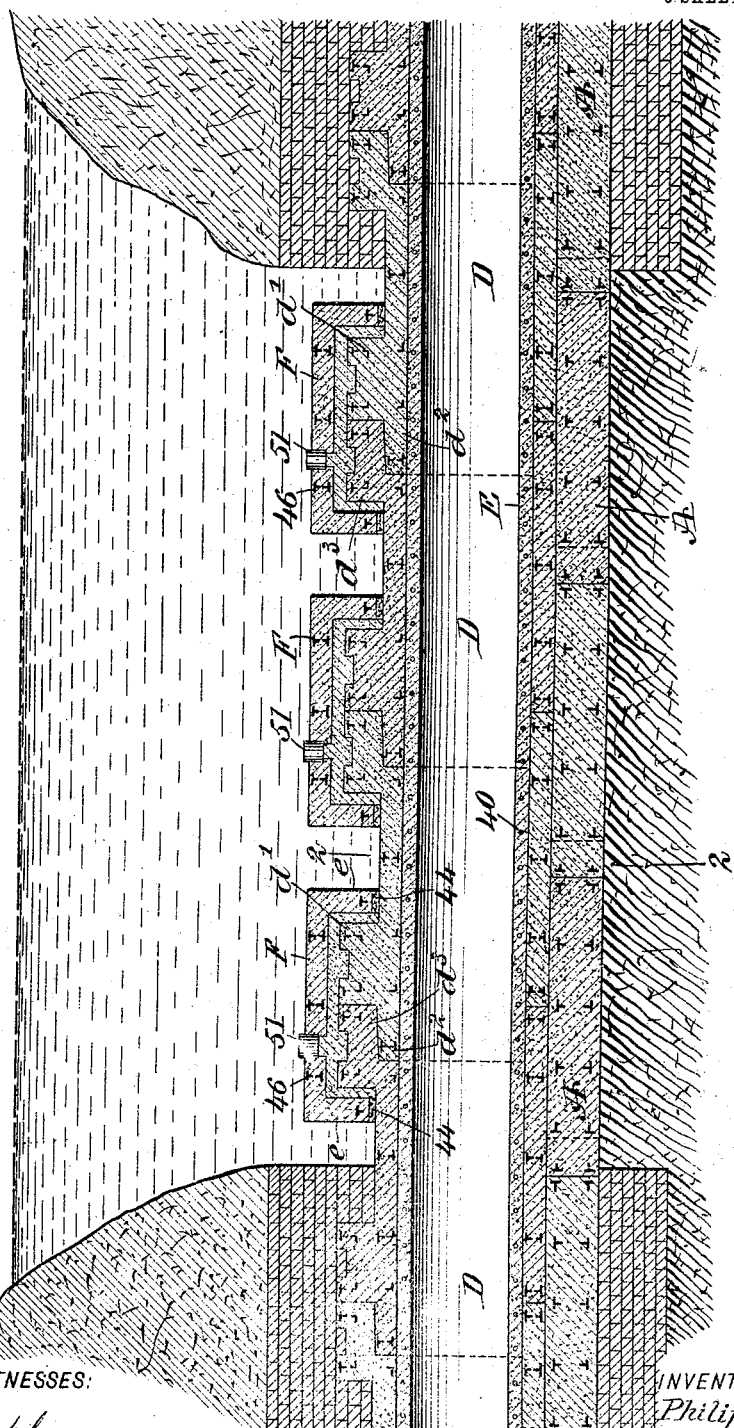

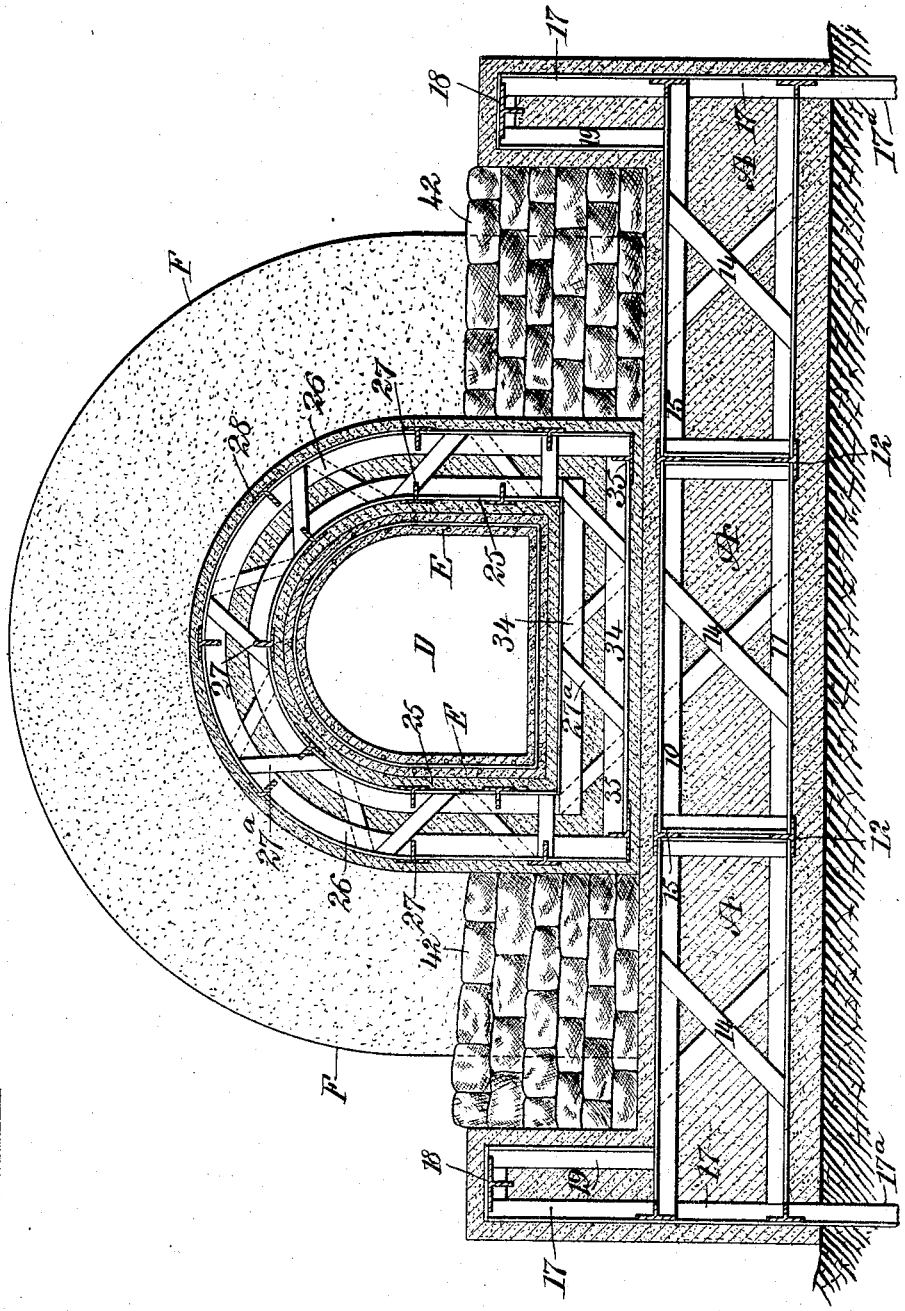

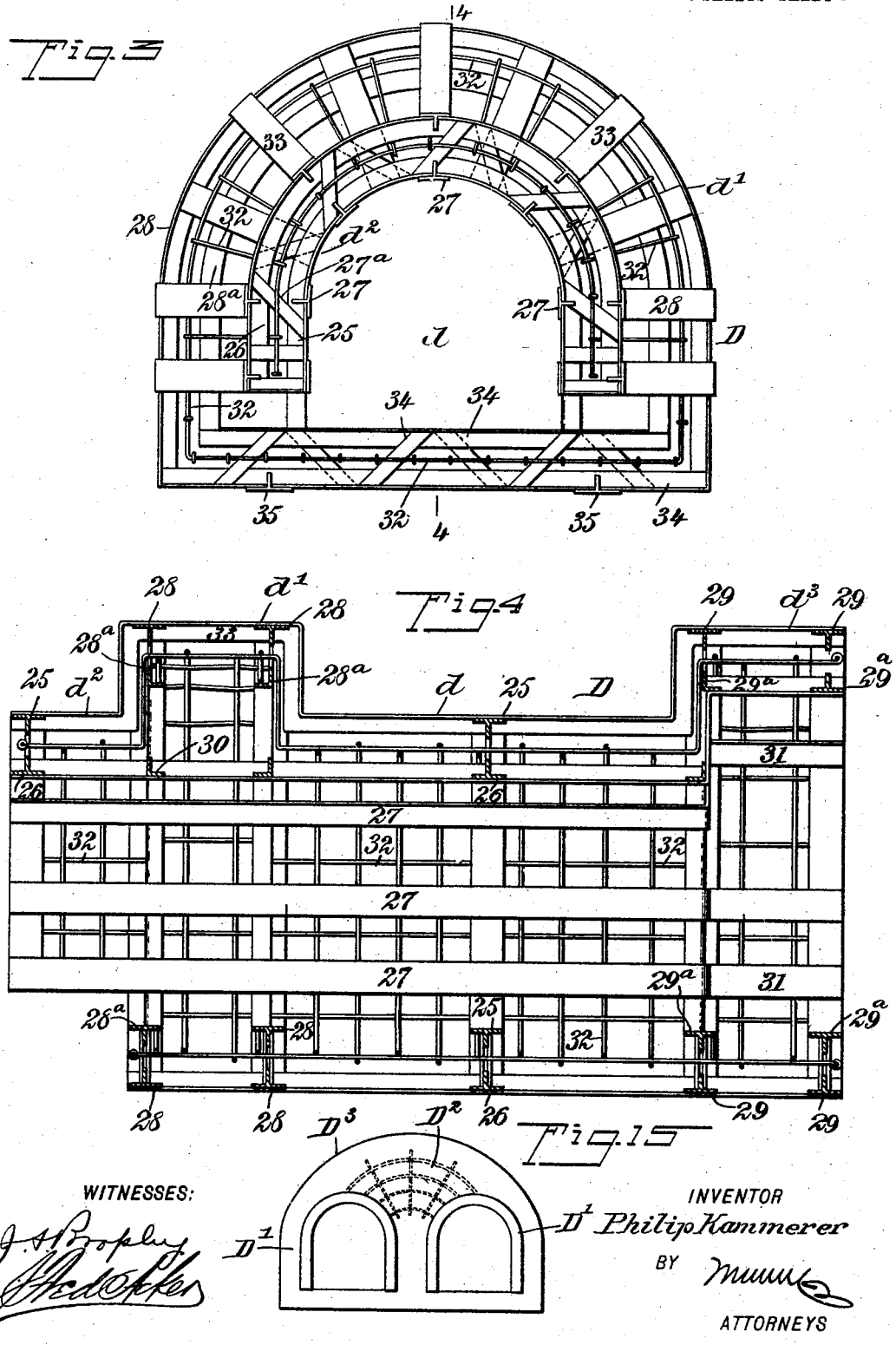
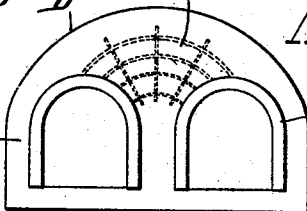

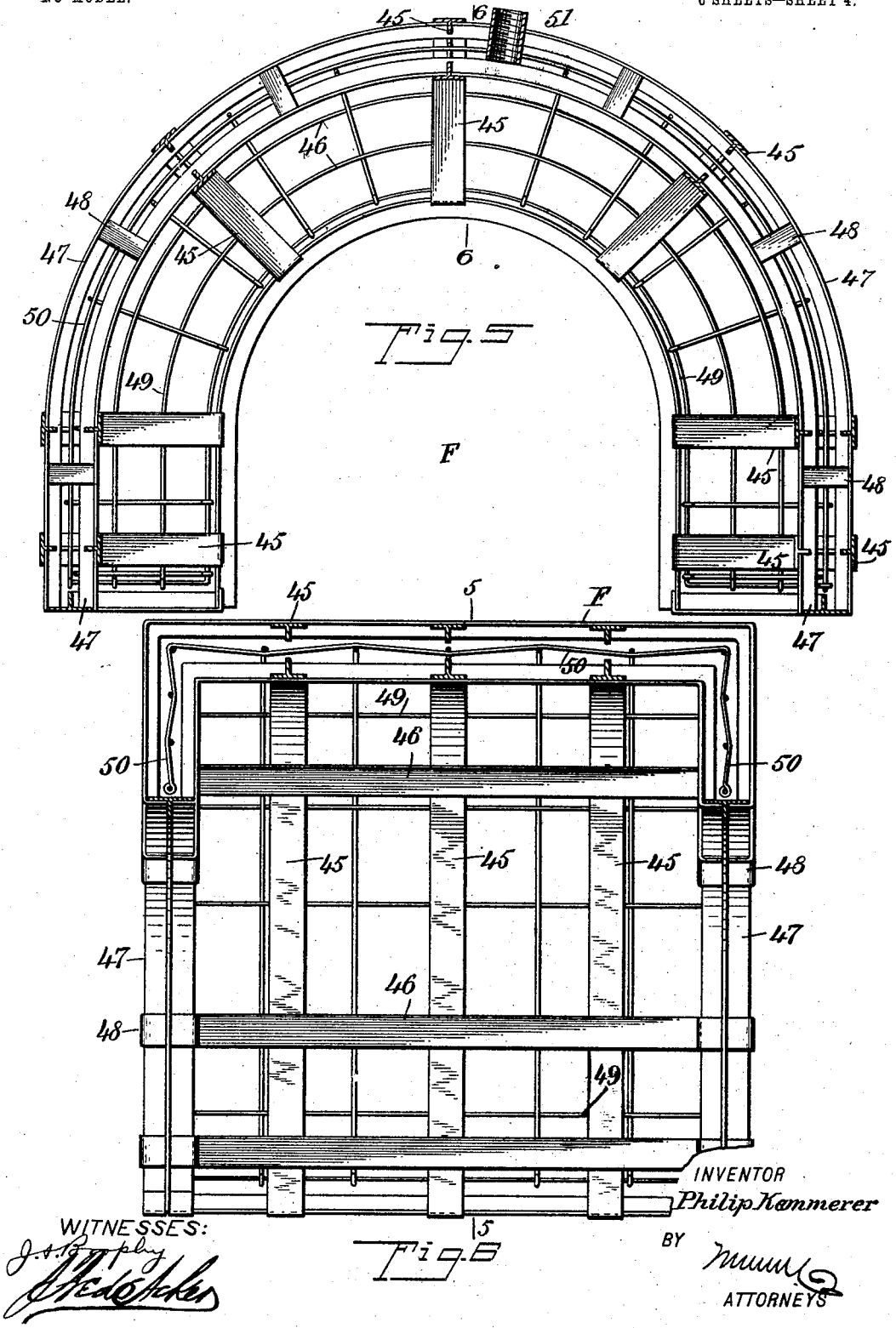

Patented October 11, 1904.

UNITED STATES PATENT OFFICE.

PHILIP KAMMERER, OF NEW YORK, N. Y.

TUNNEL CONSTRUCTION.

SPECIFICATION forming part of Letters Patent No. 772,155, dated October 11, 1904.

Application filed April 8, 1904. Serial No. 202,155. (No model.)

*To all whom it may concern:*

Be it known that I, PHILIP KAMMERER, a citizen of the United States, and a resident of the city of New York, borough of the Bronx, in the county and State of New York, have invented a new and Improved Tunnel Construction, of which the following is a full, clear, and exact description.

The purpose of the invention is to provide a tunnel construction which is made up of a series of angle-irons suitably braced and arranged for the reception of a cementing material and for interlocking connections, which sections are completely finished by a plastic covering or shell and filling before they are fitted to place, and also to provide a coupling for opposing sections which will effectually join them, the couplings being so constructed that the binding or cementing material necessary can be introduced from a desired point above the parts being fitted, so as to make the entire structure concrete or integral and thoroughly waterproof and so that any small particles, such as sand, cannot find ingress to the tunnel structure from its exterior.

Another purpose of the invention is to provide a concreted and durable base or foundation structure for the tunnel construction proper, the base or foundation being so made as to have sufficient anchorage in even a soil of uncertain character, and, furthermore, to provide means whereby the various sections of the foundation or base portion of the structure will have interlocking connection, which connection is so made as to practically render the finished foundation an integral mass and likewise integral with the superstructure or main portion of the tunnel.

Another purpose of the invention is to so construct the sections of the improved tunnel construction that they may be placed in position in a practically completed state with the least expenditure of labor, under water or in an excavation, not only with respect to the body-section and base, but also with respect to the connecting cap or coupling sections employed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a diagrammatic sectional view illustrating the application of the construction and the assemblage of the several parts. Fig. 2 is an enlarged vertical section through the structure, taken practically on the line 2 2 of Fig. 1. Fig. 3 is an end view of one of the body-sections in skeleton form, the filling having been omitted. Fig. 4 is a vertical longitudinal section taken practically on the line 4 4 of Fig. 3. Fig. 5 is a transverse section of the cap connecting or coupling section in skeleton form, the filling having been omitted and the section being taken practically on the line 5 5 of Fig. 6. Fig. 6 is a vertical longitudinal section taken substantially on the line 6 6 of Fig. 5. Figs. 7 and 8 are perspective views of mating body-sections in the complete form. Fig. 9 is a perspective view of the base or foundation section in complete form. Fig. 10 is a plan view of the base or foundation section in skeleton form. Fig. 11 is an end view of the base or foundation section shown in Fig. 10. Fig. 12 is a vertical section through a cage structure employed in finishing the interior of the tunnel, the section being taken practically on the line 12 12 of Fig. 13. Fig. 13 is a section through the said cage, taken at an angle to the section shown in Fig. 12 and practically on the line 13 13 of said Fig. 12. Fig. 14 is a detail sectional view illustrating how the base or foundation sections are united, and Fig. 15 is a diagrammatic view of an end of a tunnel construction having two passage-ways.

In setting forth my improvement I will first describe the base or foundation of the structure, then the construction of the body-sections of the tunnel, and finally the connections between the body-sections and the manner in which such connections are made, together with the general plan of rendering the body portions of the tunnel safe against lateral displacements.

With reference to the base or foundation structure, which may be safely set and speedily placed in position upon even a shifting or uncertain bed, a section of such construction is shown in Figs. 9, 10, and 11, the section being illustrated in completed form in Fig. 9 and in skeleton form in Figs. 10 and 11. I have designated the sections of the base or foundation of the tunnel contruction as A, and in the detail formation of these sections (shown best in Figs. 9, 10, and 11) it will be observed that each section A is made up of a series of top and bottom T or angle irons 12 and top and bottom end transverse bars or irons 13 of similar nature, together with brace-bars 14, preferably crossed, and sundry upright angular or T braces 15. Further, in the construction of each base-section A the upper and lower end bars 13 extend beyond the side bars 10 and 11 a desired distance, as is shown at 16 in Fig. 10, and at the end of each section vertically-disposed bars 17 are located at the corners and in any desired number between the corner-bars. These vertical bars 17, which are of angle-iron, preferably T-iron, extend both above and below the body of the section, as shown in Figs. 9 and 11, and at their upper portions support an upper bar 18, from the inner side edges of which upper bars straps 19 extend downward to the upper portion of the body, thus forming skeleton boxes or chambers 20 at the upper end portions of each base or foundation section A. The angle brace-bars 15 extend outward from the side edges of the body, and the angle-bars 15 at each side of the center of one side of a section are connected at their outer ends by top and bottom bars 21 of similar formation. All of these bars are so disposed as to produce a skeleton dovetail box-tongue B, while the brace-bars 15 adjacent to the adjacent end portions of the base-section on the same side have their inner side faces oppositely inclined to the opposing side faces of the box-tongue B, forming angular or skeleton box-like tongues B' representing one-half of the said intermediate dovetail tongue B. The end braces 15 to this end are connected at their outer extremities with the projecting end portions of the end bars at that side, such connection being brought about by upper and lower angular bars 22, as is illustrated in Fig. 10. Therefore I obtain two dovetail spaces C and C', located between the central dovetail tongue B, above mentioned, and the partial side dovetail tongues B'. At the opposite side of each section I produce two dovetail skeleton box structures $B^2$ and $B^3$, and these are located one at each side of the central portion of that side of the section, as is also shown in Fig. 10. These skeleton dovetail box-tongues $B^2$ and $B^3$ are formed by the upper and lower angle-braces 15, the upper and lower braces being made to diverge outwardly from the body at what is the side portions of the tongues, and the upper and lower braces 15 are connected at their outer extremities by upper and lower connecting-bars 23 of like formation, as is clearly readable from Fig. 10. Under this construction it will be observed at this latter-named side of a section I obtain a central dovetail space $C^2$, which is between the two dovetail box-tongues $B^2$ and $B^3$, and I furthermore obtain two partial dovetail spaces $C^3$ and $C^4$, which are located between the outer sides of the dovetail box-tongues $B^2$ and $B^3$ and the projecting portions of the end bars at that side of the section. Therefore when such sections are to be united and to be placed on a suitable bed as united the central box-tongue B of one section will enter the dovetail space $C^2$ of the next section and will completely fill up such space, and at the same time the partial dovetail box-tongues B' will enter and fill up the equivalently-formed spaces $C^3$ and $C^4$ at the same side of the section at which the central dovetail space $C^2$ is located. In this manner one section after the other may be laid and satisfactorily set. The angular irons just described in the formation of a foundation or base section are not deemed quite sufficient to render proper rigidity to a section. Consequently I employ a system of cross-wiring the strands of which are designated on the drawings as 24. This cross-wiring is at the top and at the bottom of a section and extends to and is carried out equally with relation to the construction of the fully-dovetail and partially-dovetail tongues heretofore referred to.

From the foregoing description it will be readily understood that a skeleton box-frame is obtained having a box-chamber, as stated, extending upward from its body, and it may be mentioned that the lower portions $17^a$ of the corner or intermediate irons or bars at the ends of a section may be carried downward as far as may be found necessary below the bottom of the body of a section, as these downwardly-projecting portions $17^a$ of such bars are intended to enter into the body on which the foundation is to be laid and to anchor or secure these sections in position on such bed.

Each section A, constructed as has been described, is adapted to be filled with a cement of any suitable description and to be covered with the same material, as is shown in Fig. 9, and when a skeleton section has thus been rendered into practically a solid mass it is lowered down to its proper seat on the bed on which it is designed to lie, and the dovetail interlocking connection is obtained between the two sections in the manner which has been heretofore particularly mentioned. Further, in connection with the sections A for the foundation or base it may be stated that each section is made of sufficient length to extend from one side of the proposed bed to the other.

With relation to the body-sections D these sections are shown in the skeleton form in Figs. 3 and 4 and in the completed form in Figs. 7 and 8 and as laid in position in Fig. 1. The body-sections are made up of series of angle-irons and metal braces in such form that they present an open-work structure adapted to be filled to a certain extent with a cement of any approved character. The body-sections D are identical in construction and comprise a main section $d$, which is of uniform dimensions throughout its length, a lip-section $d^2$ at one end, of the same dimensions as the main portion $d$, and a boss $d'$, which is adjacent to the lower section $d^2$ and is made up of a series of arched bars 28 and $28^a$, also preferably of T-iron, although any angle-iron may be employed, and these arched bars or beams 28 and $28^a$ are outside of the exterior of the main portion $d$ and are connected with each other and with the main portion $d$ by straps 33, extending longitudinally of the section and suitably secured to the bars or members which they are adapted to hold in position. The opposite boss portion $d^3$ of a body-section D is constructed almost identically with the formerly-described boss portion $d'$, consisting of arched bars 29 and $29^a$ tied together by straps; but this portion of the structure is braced by short longitudinal bars 31, (shown in Fig. 4,) and, furthermore, a lattice-work of wire 32 of suitable gage or of rods of suitable diameter is employed, so as to make practically a cage to be filled around the inner margin of the main portion $d$ with cement, as has been stated. The frame or cage forming practically the body portion of a body-section D of the structure is completed by the addition of transverse bottom bars 34 of angle-iron or T-iron, strengthened by suitable braces $34^a$, extending from a lower to an upper part, and also by longitudinally-extending beams 35, which are also preferably of T-iron or of angle-iron. These body-sections D are completed in every particular before they are lowered into the water or into the openings into which they are to be placed, and in completing the body-sections D a cement is poured into and formed upon the section until there is a solid mass from the inner wall of the main portion $d$ to and including the outer wall. This plastic material is also placed in proportionate amounts on the bosses $d'$ and $d^3$ of the section; but in placing this plastic material on the enlargements or bosses of a section a continuous channel 37 is formed in each of these latter-named parts, as is shown in Figs. 7 and 8, the said channels extending from the bottom of a section at one side to the bottom of the same section at the opposite side, as is also clearly shown in Figs. 7 and 8. As heretofore stated, the bottoms of the body-sections D are preferably made flat interiorly and exteriorly. When the sections are to be assembled, the lipped portion $d^2$ of one section is made to enter the end boss $d$ of the opposing or mating section, a suitable recess 38 having been formed in the receiving-section to properly receive the lip portion $d^2$ of the entering-section in such manner that when two sections have been brought together in the order described the interior of both sections will be of the same dimensions or longitudinally or practically transversely uninterrupted.

After the body-sections have been placed in position on the base or foundation made up of the sections A, heretofore referred to, it is necessary that the body-sections shall be coupled or connected, so that they will not part under any condition of wear. This connection will be shortly described. Before describing it, however, it is deemed best at this point to mention the manner in which the interior of the channel proper—namely, the body-sections D—is finished off. A cage E is employed, which is shaped so as to fit snugly in the passage-way of the channel proper or in the passage-way formed in the body-sections D. This cage E is of wire, comprising arched strands 39 and longitudinal interwoven strands 40, which strands may be connected in any suitable or approved manner or they may be held together by frictional contact only. When these cages are in place in the tunnel, the interstices are filled in with cement, which serves to hold the cages in place, and any number of these cages may be placed one within the other, treated in a similar manner, so as to produce an uninterrupted or a solid cement wall extending from one end of the tunnel to the other and covering up completely and effectually any possible openings that may remain after the connecting mediums, to be hereinafter described, have been placed in position. I will also take occasion at this time to state how I propose to prevent the sections from becoming laterally displaced, and, in fact, the manner in which these sections are to be held permanently in position where they have been originally placed. These means are clearly shown in Fig. 2 and consist in the employment of any necessary number of bags 42, which are filled with cement. These bags are sunken or otherwise placed one on the other upon the upper portion of the base or foundation and extend from the outer side walls of the various main sections D of the tunnel to the upwardly-extending box construction or abutments at the end portions of the base or foundation sections. When the tunnel is to be covered with water, the water entering the bags and reaching the cement will bring the various bags firmly in relation one to the other, the bags being preferably placed to break joints, and will eventually form them into so many solid blocks of an impervious material, and, in fact, create an almost integral wall of masonry between the outer sides of the body of the tunnel and the upwardly-extending brace-walls or abutments at the ends of the foundation-sections.

It is obvious from the foregoing description that a tunnel of this character may be laid directly upon the bed of a stream and that practically but little excavation, if any, is necessary, as the sections being necessarily weighty when they are placed in position on the soft bed of a stream will practically find a level sufficient for all practical purposes.

The main sections of the tunnel—namely, the sections D—are held together in a water and gas tight manner by means of caps or couplings F, and these caps or couplings are of segmental formation and are provided with flanges $e$ at their ends. When two sections D of a tunnel are brought together in the manner which has been described, the boss $d'$, for example, on one section D will be in close relation to a boss $d^3$ of the opposing section, and the lip $d^2$ of one section entering the recessed portion 38 of the other section produces an overlapping joint. The cap or coupling F is of such size that when two sections have been joined, as stated, the flanges of the cap or coupling employed will pass down, one flange at one outer side of one boss and the other flange at the outer side of the other boss, as is shown in Fig. 1, and in order that there shall be a positively tight connection between the lower portions of the flanges and the outer faces of the body portions of the body-sections D washers 44, preferably of felt, are made to intervene beween these two parts, as is also shown in Fig. 1, and these washers also serve to prevent fracture of the cap or coupling when under certain conditions it is placed in position. The cap or coupling F is made of such dimensions as to leave a space between the inner face of the cap or coupling and the opposing face of the surfaces over which the cap or coupling may be placed, as is also shown in Fig. 1. This cap or coupling F consists of a frame constructed of metal, as is shown in Figs. 5 and 6, and the said frame before the cap or coupling is placed in position is filled with a cement, so that each and every part of this tunnel construction may be practically prepared in almost every detail before it is lowered down to place. As illustrated in Figs. 5 and 6, the body portion of the cap or coupling F consists of arched T or angle bars 45 connected by similar bars 46, and the flanges consist of suitably-arched angle or T bars 47 held to the body by means of stirrup-straps 48, and a lattice-work 49 of wire is also employed in the construction of the body, so as to hold the cement filling in proper position. A lattice 50 of wire is also used in connection with the flanges of the cover. A preferably interiorly-threaded nipple is located in the upper portion of each coupling or cap F, and a hose, for example, is screwed into this nipple, so that cement in liquid form may be forced down through the hose and into the space between the cap or coupling and the opposing sections D in connection with which it is used in order to hermetically seal such space, and thus effectually prevent the water from entering at any point of connection between two body-sections D, and, as has been stated, the cemented cages placed in the passage-ways of the body-sections D assist largely in preventing any possible leakage.

In Fig. 15 I have illustrated two series of main sections D', placed side by side and connected by a brace construction $D^2$, which may be of wire rods or bars either T-shaped or angular in cross-section. In this form of tunnel construction I also contemplate, as is shown in Fig. 15, including both series of main sections D' and the connecting medium $D^2$ in a casing $D^3$, which is preferably of cement.

Having thus described my invention, I claim as new and desire to secure by Letters Patent—

1. In tunnel construction, a base or foundation section, comprising a metallic skeleton frame and a filling of a cement compound, said structure being provided with means for anchoring it, as specified.

2. In tunnel construction, base or foundation sections having interlocking connection and consisting of a skeleton frame having a plastic filling and coating, and anchoring means constituting a portion of each section, as described.

3. Base or foundation sections for tunnel construction, each consisting of a skeleton frame constructed of angle-iron and wire, opposing sections having respectively wedge-shaped tongues and corresponding grooves to receive the tongues, the frame having a filling and coating of concrete.

4. In tunnel construction, base or foundation sections, comprising a skeleton frame constructed of angle-irons and wire mesh, opposing sections having respectively wedge-shaped tongues and corresponding recesses to receive such wedge tongues, each section having also upwardly-extending end barriers, and a filling and outer coating of a plastic material, and anchoring devices for the sections, substantially as described.

5. In a tunnel construction, sections adapted, when laid, to form a concrete structure, each section consisting of a skeleton frame, a binding material carried by the frame, and a filling and coating of plastic material applied to and hardened on the frame within and without the binding material, which application of the plastic material is made prior to the utilization of the sections.

6. In a tunnel construction, a series of members, adapted when laid to form a concrete structure, each member consisting of a skeleton frame made of intersecting angle-irons and wire mesh, and a filling and coating of plastic material for the said members, the filling and coating being applied to the members before they are utilized for service, the said members being arranged in series, the members of each series having interlocking connection one with the other.

7. In a tunnel construction, a series of members adapted when laid to form a concrete structure, each member consisting of a skeleton frame made up of intersecting angle-irons and a wire mesh, and a plastic material constituting a filling and a coating for the frame, rendering the members when connected a practically solid body, the filling and coating being applied before the members are utilized for service, anchoring devices for sundry of the members, and tongue-and-groove connections between abutting members.

8. In a tunnel construction, body-sections in which passage-ways are produced, each section having a lip at one end and an interior recess at the opposite end to receive the lip of an abutting section, and a cap hermetically sealed to the engaging end portions of abutting sections, as set forth.

9. In a tunnel construction, body-sections in which passage-ways are produced, each section having a lip at one end and an interior recess at the opposite end to receive the lip of an abutting section, an exterior channeled boss at the end portions of the trunk of the body-sections, a cap covering adjacent bosses of the sections, and a cementing material between the cap and bosses, whereby to connect the said elements in an integral manner, as described.

10. In tunnel construction, body-sections having passage-ways produced therein, couplings for the said sections, exteriorly-applied metal cages located within the said sections, extending across the joints, and a plastic coating applied to the said metal cages, whereby to form a continuous and perfectly-sealed passage-way throughout the length of the tunnel structure.

11. In tunnel construction, body-sections having arched upper portions, straight sides and a straight bottom, each body-section being provided with a lip continuous with its trunk and located at one end, and an interior recess at the opposing end, adapted to receive a lip of an opposing section, bosses exteriorly formed on the said body-sections, one near each end, the bosses conforming to the exterior shape of the sections, being provided with channels therein, and a coupling-cap adapted to embrace two opposing bosses of the connected sections, being provided with end flanges for engagement with the trunk portions of the said sections, and a filling of cement located between the coupling-cap and the said bosses.

12. In a tunnel construction, a base or foundation consisting of a skeleton frame filled and coated with a cement compound, a body portion comprising a series of interlocking sections, couplings for the sections, the couplings and the body portions of the said structure also consisting of a skeleton frame provided with a coating and a filling of cement, a cement connection between the coupling mediums and the body-sections, anchorage devices for the base or foundation sections, barriers extending up from the ends of the base-sections, and braces of inclosed plastic material in the form of walls bearing against the said barriers and the outer faces of the body portions of the said tunnel structure, as described.

13. In a tunnel construction, a base, body-sections constructed on the base, having passage-ways produced therein, barriers extending up from the base, and pliable, cement-filled members placed one on the other, constituting a wall, which wall has bearing against the said barriers and against the said body-sections.

14. In tunnel construction, a base or foundation, consisting of a series of sections transversely laid and having interlocking dovetail connection in a longitudinal direction, anchors for the sections of the base, barriers extending up from the end portions of the base, the said base-sections being constructed of intersecting bars of metal and a filling and a covering of a cement material, a body portion also constructed in sections, in which body portion the passage-ways are formed, the sections of the body portion being constructed likewise of intersecting bars of metal and a covering and a filling of a plastic material, couplings for the sections of the said body portion, constructed in like manner to the structure of the body portion, the said couplings having a cemented engagement with the sections of the body portion, and brace-walls extending from the exterior of the sections of the body portion to the barriers on the base-sections, which walls are made up of a fabric covering and a filling of cement, said objects being laid one upon the other in such manner as to break joints and to produce a perpendicular bracing structure, as described.

In testimony whereof I have signed my name to this specification in the presence of two subscribing witnesses.

PHILIP KAMMERER.

Witnesses:
J. FRED. ACKER,
JNO. M. RITTER.